Oct. 12, 1937.  G. P. BRENNER  2,095,432

DENTURE

Filed Sept. 28, 1935

INVENTOR
George P. Brenner
By R. S. Caldwell
ATTORNEY

WITNESSES
L. E. Kilian
C. L. Waal

Patented Oct. 12, 1937

2,095,432

UNITED STATES PATENT OFFICE 2,095,432

DENTURE

George P. Brenner, Milwaukee, Wis.

Application September 28, 1935, Serial No. 42,585

5 Claims. (Cl. 32—2)

The invention relates to artificial dentures, and has for an object to provide dentures which will remain firmly seated in place during mastication.

Another object of the invention is to provide dentures having posterior or molar teeth which are capable of producing effective and thorough mastication.

The invention further consists in the several features hereinafter described and claimed.

In the accompanying drawing, illustrating one specific embodiment of the invention, Fig. 1 is a plan view of a pair of upper and lower dentures constructed in accordance with the invention;

Figure 1:
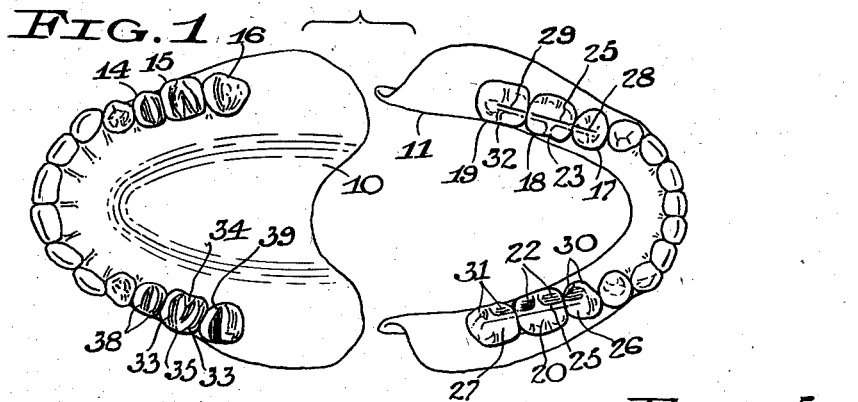
Figure 2:
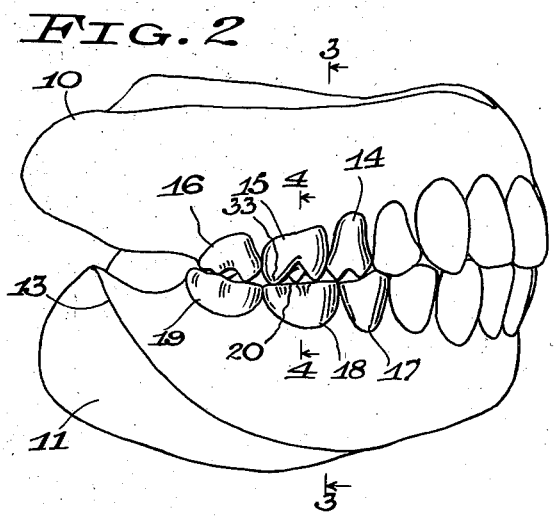
Fig. 2 is a side elevation of the dentures with the teeth in occlusion.
Figure 5:
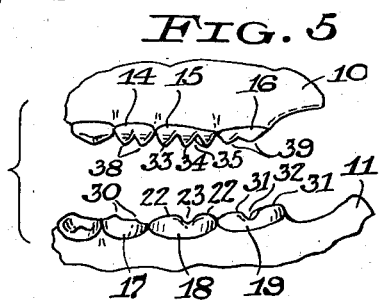
Fig. 5 is a detail elevation of the right posterior teeth, viewed from the lingual side.
Figure 6:
Fig. 6 is a detail bottom view of one of the upper posterior teeth.
Figure 7:
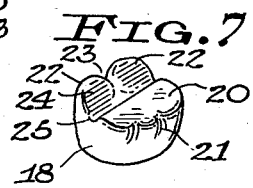
Fig. 7 is a perspective view of one of the lower posterior teeth.

In the drawing, 10 and 11 designate upper and lower dental plates formed of vulcanized rubber or other suitable material and having respective gum-receiving channels or seating surfaces 12 and 13. Anchored in the plates are respective rows of teeth including at each side upper posterior or molar teeth 14, 15, and 16, and lower posterior or molar teeth 17, 18, and 19, the other teeth being of conventional form.

Each lower tooth 18 is devoid of cusps at the outer or buccal side and has instead a substantially flat horizontal occlusal surface or platform 20, the outer side wall of the tooth having a rounded upper margin merging with the surface 20. If desired, shallow fissures or grooves 21 may be formed in the rounded margin at the buccal side. At the inner or lingual side of the tooth 18 are formed a pair of elevated portions or cusps 22 with a depression 23 between them, the cusps having inclined planes or surfaces 24 sloping down at about 45° to the flat horizontal surface 20, thus forming a reentrant angle between the surface 20 and the inclined planes 24. The inclined planes 24 of the two cusps 22 of each tooth 18 are preferably coplanar. Preferably a groove 25 is formed in the top surface of the tooth between the horizontal surface 20 and the bases of the cusps 22, the groove extending from the mesial to the distal surface of the tooth and communicating with the depression 23.

The lower teeth 17 and 19 are provided at their outer or buccal sides with substantially flat horizontal surfaces 26 and 27, respectively, which form extensions of the flat surface 20 on the tooth 18. Preferably, the surfaces 26 and 27 extend to about the middle regions of the respective teeth. The upper surfaces of the teeth 17 and 19 also have respective grooves 28 and 29 aligned with 10 and forming extensions of the groove 25, and terminating near the middle points of these teeth. The teeth 17 and 19 have respective lingual elevations or cusps 30 and 31 similar to the cusps 22, there being a depression 32 between the cusps 30 31 communicating with the channel 29.

The upper posterior teeth 15 are engageable with the lower posterior teeth 18 and each has transversely extending food-cutting ridges 33 and a shorter intermediate ridge 34 at the lingual side. Channels 35 are formed between the ridges and merge at their outer ends into a single channel. The ridges are of generally convex shape lengthwise and have substantially straight horizontal portions 36 engageable with the flat occlusal surfaces 20 of the lower teeth 18. The lingual ends 37 of the ridges are sloping to engage the inclined planes 24 of the lower teeth 18, and the buccal ends 37' of the ridges 33 and 34 slope upwardly from the horizontal portions 36 at an angle of about 45° to the horizontal. The upper teeth 14, which engage the lower teeth 17, have transverse food-cutting ridges 38 generally similar to the ridges 33, and the upper teeth 16 have similar transverse ridges 39 to engage the lower teeth 19.

Figure 4:
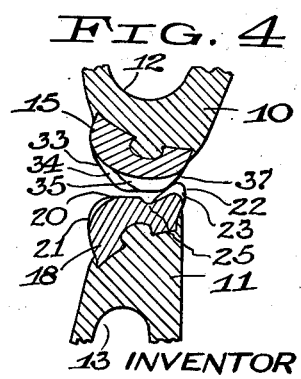
Fig. 4 is a detail sectional view taken on the line 4—4 of Fig. 2, but showing the teeth at a different stage of mastication.

By this relation of the upper and lower teeth, the masticating pressure is exerted principally at or near the lingual sides of the teeth, and the buccal sides of the teeth are relieved of masticating pressure. During mastication the motion of the lower jaw is such as to effect engagement between the sloping lingual sides of the upper teeth and the inclined planes or sloping surfaces of the lingual cusps of the lower teeth, as indicated in Fig. 4, and also to effect engagement between the horizontal surfaces of the upper and lower teeth. The central point or region of masticating pressure is spaced inwardly or lingually from the fulcrum points formed by the engagement of the channeled plates with the gums, with the result that, although mastication may be confined to one side of the mouth, both sides of the plates remain firmly seated on the gums or jaw ridges, there being no tendency for the plates to tilt out of seating engagement.

The action of the transversely ridged upper teeth and the cooperating lower teeth is to cut the food mass or bolus into strips or shreds, the bolus being effectively comminuted as mastication proceeds. During mastication the bolus is squeezed through the various grooves or channels formed in the occlusal surfaces. The portion of the bolus at the buccal sides of the teeth presses upwardly and inwardly against the sloping portions 37' of the upper teeth in an inclined line of action favorable to the seating of the denture on the gums at both sides.

Figure 3:
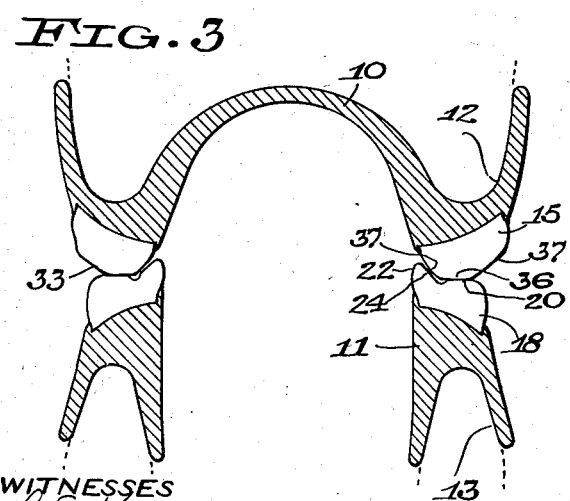
Fig. 3 is a sectional view taken on the line 3—3 of Fig. 2.

When the teeth are in occlusion and laterally centered, as seen in Fig. 3, the horizontal occlusal surfaces 20 and 36 are in engagement, and the sloping occlusal surfaces 24 and 27 are spaced out of contact. This relation permits a certain amount of lateral movement of the lower jaw with a sliding engagement of the horizontal occlusal surfaces, before the sloping occlusal surfaces are brought together, and thereby avoids a lock bite and consequent injury to the gum tissues.

In an artificial denture, the permissible biting pressure is much lower than with natural teeth. However, with the teeth above described it is possible to secure effective mastication notwithstanding the relatively low biting pressure.

What I claim as new and desire to secure by Letters Patent is:

1. A lower denture having a gum-receiving channel and having certain posterior teeth each provided with a substantially horizontal occlusal surface on the buccal side and further provided with an elevated lingual portion having an occlusal surface sloping upwardly from said horizontal surface, said sloping surface being displaced lingually from said channel, and an upper denture having a gum-receiving channel and having certain posterior teeth with occlusal portions engageable during mastication with the horizontal occlusal surfaces and the sloping occlusal surfaces of said lower teeth, said sloping occlusal surfaces being out of engagement with the upper teeth when the cooperating teeth are in occlusion and laterally centered.

2. A pair of upper and lower dentures having cooperating posterior teeth and having respective gum-receiving channels, the lower posterior teeth being provided with elevated portions at the lingual side having occlusal surfaces sloping downwardly and outwardly and spaced lingually from the channel of the lower denture, each of said lower teeth having a substantially horizontal occlusal surface extending outwardly from the base of said elevated portion, and the upper posterior teeth having sloping portions at the lingual side engageable with the sloping portions of said lower teeth, whereby during mastication the pressure exerted on the sloping surfaces of said upper and lower teeth will cause said dentures to remain seated on the gums at both sides.

3. A set of artificial teeth in which certain of the lower posterior teeth are substantially devoid of buccal cusps, having instead substantially horizontal occlusal surfaces, and provided with lingual elevations having inclined occlusal surfaces sloping upwardly from said horizontal surfaces, and the upper posterior teeth of which have transversely extending occlusal ridges engageable with the horizontal and inclined occlusal surfaces of the lower teeth.

4. A set of artificial teeth in which certain of the lower posterior teeth are substantially devoid of buccal cusps, having instead substantially horizontal occlusal surfaces, and provided with lingual elevations having inclined occlusal surfaces sloping upwardly from said horizontal surfaces, and the upper posterior teeth of which have occlusal surfaces convex in a transverse direction for engagement with the horizontal and inclined occlusal surfaces of the lower teeth.

5. A set of artificial teeth in which certain of the upper and lower posterior teeth have cooperating occlusal surfaces, the lower of which is transversely reentrant and elevated only at the lingual side, and the upper of which is transversely convex, said convex occlusal surface being transversely ridged and presenting a channel extending from the lingual to the buccal sides of the upper tooth.

GEORGE P. BRENNER.